(12) United States Patent
Srivastava et al.

(10) Patent No.: US 8,626,766 B1
(45) Date of Patent: Jan. 7, 2014

(54) SYSTEMS AND METHODS FOR RANKING AND IMPORTING BUSINESS LISTINGS

(75) Inventors: Anurag Srivastava, Milpitas, CA (US); Sachin Jain, Milpitas, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 13/247,441

(22) Filed: Sep. 28, 2011

(51) Int. Cl.
G06F 7/00 (2006.01)
G06F 17/30 (2006.01)
G06Q 99/00 (2006.01)

(52) U.S. Cl.
USPC .......................................... 707/737; 705/317

(58) Field of Classification Search
None
See application file for complete search history.

(56) References Cited

U.S. PATENT DOCUMENTS

| | | | |
|---|---|---|---|
| 6,189,003 B1 * | 2/2001 | Leal | 1/1 |
| 6,484,161 B1 | 11/2002 | Chipalkatti et al. | |
| 7,647,344 B2 | 1/2010 | Skurtovich, Jr. et al. | |
| 2003/0217056 A1 | 11/2003 | Allen et al. | |
| 2003/0223565 A1 | 12/2003 | Montemer | |
| 2004/0052346 A1 | 3/2004 | Ohta et al. | |
| 2004/0267743 A1 | 12/2004 | Dasari et al. | |
| 2006/0004595 A1 | 1/2006 | Rowland et al. | |
| 2006/0074932 A1 | 4/2006 | Fong et al. | |
| 2006/0212416 A1 | 9/2006 | Taylor et al. | |
| 2007/0073696 A1 | 3/2007 | Reynar et al. | |
| 2008/0091412 A1 * | 4/2008 | Strope et al. | 704/10 |
| 2011/0029467 A1 | 2/2011 | Spehr et al. | |

* cited by examiner

*Primary Examiner* — Jason Liao
(74) *Attorney, Agent, or Firm* — Lerner, David, Littenberg, Krumholz & Mentlik, LLP

(57) ABSTRACT

Systems and methods for ranking and importing business listings are provided. In one aspect, a processor receives a plurality of business listing groups, where each business listing group includes business listings. The processor selects a sample set of business listings from each business listing group for verification. The processor determines ranks for the business listing groups based on verification information indicating the accuracy of the business data in the selected sample set of business listings. The processor selects the highest ranked business listing group based on the verification information and imports the business listings in the selected business listing group into a set of business listing records for presentment to a user.

16 Claims, 6 Drawing Sheets

| | Category | Sub-Category | Name | Address | Telephone | Fax | Email | Web-Site | Hours | Other |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| 5 | | | | | | | | | | |

| Group | Sample | Category | Sub-Category |
|---|---|---|---|
| Business Listing Group 1 | 5 % | Automotive | Dealers |
| Business Listing Group 2 | 5 % | Automotive | Dealers |
| Business Listing Group 3 | 5 % | Automotive | Dealers |

| Group | Rank | Accuracy | Group 1 Overlap | Group 2 Overlap | Group 3 Overlap | Aggregation Order |
|---|---|---|---|---|---|---|
| Business Listing Group 1 | 1 | 100 % | N/A | 75 % | 95 % | 1 |
| Business Listing Group 2 | 3 | 88 % | 75 % | N/A | 90 % | 2 |
| Business Listing Group 3 | 2 | 96 % | 95 % | 90 % | N/A | 3 |

FIG. 5

SYSTEMS AND METHODS FOR RANKING AND IMPORTING BUSINESS LISTINGS

BACKGROUND

People often rely upon a directory service provider to obtain information. For example, it is possible to look up a business's phone number, address, or other relevant information such as business hours by calling a directory service provider or accessing the directory service provider's website. This type of business information can constitute a business listing. Although a business can provide its own business listing, a directory service provider can provide information for a large number of diverse business entities, thus providing an end user with relevant information in an expeditious and reliable manner.

The accuracy of information provided by a directory service provider is of primary importance in providing reliable information to the end user. In certain cases, a directory service provider builds its repository of directory listings by aggregating listings obtained from a variety of listing sources. Such aggregation of information can result in directory listings that contain incomplete, inaccurate, or conflicting information. For example, a business listing provided by a particular listing source can be incomplete in that it is missing in a phone number, street address, or other business information. Another listing provided may provide information about a business that no longer exists or has changed in some manner. In yet another example, a listing obtained from one listing source can contain information that conflicts with the information obtained from another listing source, making it more difficult to determine relative accuracy of the information.

SUMMARY

Systems and methods are provided for processing directory listings based on a ranking of listing information aggregated from multiple listing sources.

In one aspect, a method for processing business listings is provided. The method includes receiving a plurality of business listing groups, each business listing group including a plurality of business listings; selecting a sample set of business listings from each business listing group for verification; receiving verification information for the sample set of business listings selected from each business listing group; assigning, using a processor, a rank to each of the plurality of business listing groups based on the received verification information; selecting a highest ranked business listing group based on the rank assigned to each business listing group; and, importing the plurality of business listings in the highest ranked business listing group into a set of business listing records for presentation to a user.

In another aspect, a system for processing business listings is provided. The system includes a memory storing instructions and data, and a processor configured to execute the instructions. The data includes a plurality of business listing groups, where each business listing group includes a plurality of business listings. The instructions, when executed by the processor, cause the processor to select a sample set of business listings from each business listing group for verification; receive verification information for the sample set of business listings selected from each business listing group; assign a rank to each of the plurality of business listing groups based on the received verification information; select a highest ranked business listing group based on the rank assigned to each business listing group; and, import the plurality of business listings in the highest ranked business listing group into a set of business listing records for presentation to a user.

In yet another aspect, a tangible non-transitory computer-readable recording medium including instructions is provided. The instructions, when executed by a processor, cause the processor to perform the operations of: receiving a plurality of business listing groups, each business listing group including a plurality of business listings; selecting a sample set of business listings from each business listing group for verification; receiving verification information for the sample set of business listings selected from each business listing group; assigning, using a processor, a rank to each of the plurality of business listing groups based on the received verification information; selecting a highest ranked business listing group based on the rank assigned to each business listing group; and, importing the plurality of business listings in the highest ranked business listing group into a set of business listing records for presentation to a user.

BRIEF DESCRIPTION OF THE DRAWINGS

FIG. 2 further illustrates an example of business listing.

FIG. 4 illustrates an example of listing group configuration rules in accordance with an aspect of the disclosure FIG. 5 illustrates an example of ranking and aggregating business listings in accordance with an aspect of the disclosure.

DETAILED DESCRIPTION

Figure 1:
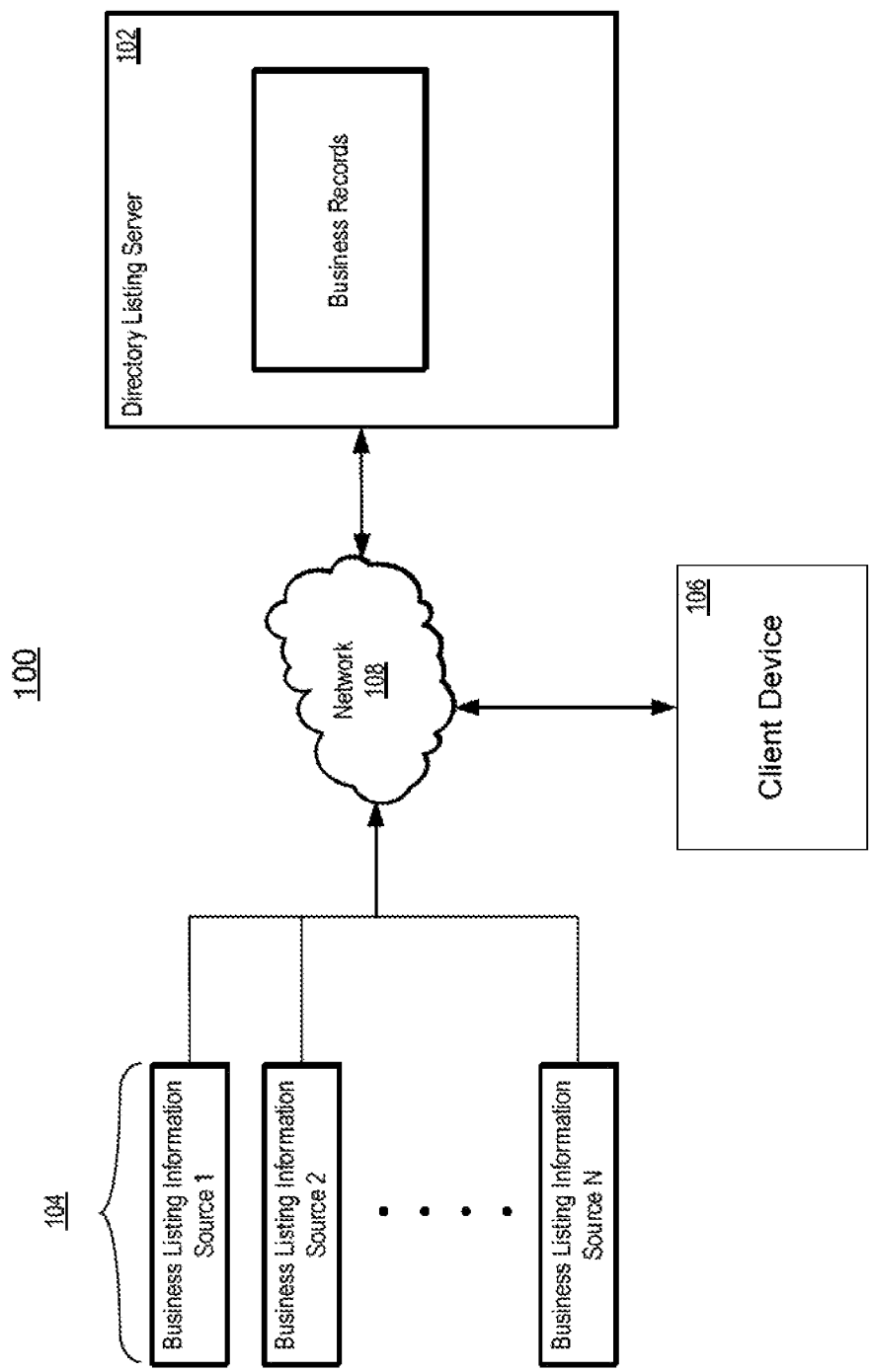
FIG. 1 illustrates a system according to various aspects of the disclosure.

FIG. 1 illustrates an example system 100 that includes a directory listing server 102 in communication with listing information sources 104 and one or more client device 106 via a network 108. The network 108 can be implemented as any combination of networks. As examples, the network 108 can be a Wide Area Network ("WAN"), such as the Internet; a Local Area Network ("LAN"); a Personal Area Network ("PAN"), or a combination of WANs, LANs, and PANs. Moreover, the network 108 can involve the use of one or more wired protocols, such as the Simple Object Access Protocol ("SOAP"), wireless protocols such as 802.11a/b/g/n, Bluetooth, or WiMAX, transport protocols such as TCP or UDP, an Internet layer protocol such as IP, application-level protocols such as HTTP, a combination of any of the aforementioned protocols, or any other type of network protocol now known or later developed. In addition to the foregoing, the network 108 can also include telephone exchange network such as a PSTN, PBX, or VOIP network. Thus, the directory listing server 102 can be configured to include appropriate mechanisms for providing business listing information over various types of network 108 to one or more end users that request such information using a supported computing or telephone device supported by the network 108 as described further below.

The directory listing server 102 maintains records which define a set of business listings. A business listing can include many different types of information about a business, such as the its title (e.g., corporate business name ("Acme, Inc."), informal business name ("Acme"), etc.), contact information, a URL for the business' website, a description of the business, hours of operation, or any other type of information about the business.

The one or more client devices 106 can comprise many different types of client devices, and the directory listing server 102 can provide business listings of a type and in a manner relevant to a particular client device over the network. For example, where the client device 106 is an intermediate information provider such as an Internet search provider, a social network provider, or a map service provider, the directory listing server 102 can provide business listings to such providers for inclusion in one or more web-pages in response to requests received from such providers over the network 108.

In other aspects, the directory listing server 102 can also be configured to directly provide one or more business listings to end users using a variety of consumer devices. For example, an end user can use a client device 106 that is a desktop computer, a laptop, a smartphone, a Personal Digital Assistant ("PDA"), a tablet computer, a netbook, etc., to request and access information from the directory listing server 102. The directory listing server 102 can include the functionality, for example, of a web-server, an Internet search provider, and/or a telephone directory service provider to provide matching business listing information to the end user in a suitable format.

To provide a specific example, an end user can use a client device 106 such as a desktop computer or a smartphone to transmit, using the Internet protocol, one or more search queries over the network 108 to the directory listing server 102. In response to the queries, the directory listing server 102 can transmit one or more web-pages that include matching business listing back to the desktop computer or smartphone for display to the end user over the network 108.

In another example, an end user of a client device 106 such as a wired or wireless phone can dial a telephone number maintained by the directory listing server 102 to request one or more business listings. The end user can provide the request to the directory listing server by either speaking or using the telephone keypad. In this case, the directory listing server 102 can be configured to receive the request (e.g., using voice recognition) and provide one or more business listings to the end user in an audible or other format.

When a business listing is requested from the directory listing server 102, the directory listing server 102 can transmit a response that includes a complete business listing. The requesting party can parse the business listing to extract a subset of business information for the requesting party's use. For example, an Internet search provider can request a business listing from the directory listing server 102 in response to an Internet search query by an end user. When the Internet search provider receives the business listing, the Internet search provider can then transmit the business' title and associated URL to the end user, rather than the complete set of business information that the Internet search provider initially received. Alternatively, the Internet search provider can provide the complete set of business information to the end user.

The directory listing server 102 can also transmit a select portion of the business listing to a requesting party. Using the Internet search provider example above, the directory listing server 102 can receive a request for a business listing title and business listing URL, and based on this request, the directory listing server 102 can transmit the business' title and associated URL to the Internet search provider. However, the examples above can also apply where the directory listing server 102 communicates with the end user. Hence, the directory listing server 102 is flexible and robust enough such that it can provide a complete business listing or a subset of the business listing, depending on the request that the directory listing server 102 receives.

In one aspect, the directory listing server 102 receives business listings from business listing information sources ("listing sources") 104 over the network 108. The directory listing server 102 ranks and aggregates the business listings into the business records that are ultimately provided to client devices 106. The listing sources 104 can include any number and/or type of information sources. For example, the listing sources 104 can include business webpage providers, telephone directory providers, Internet users, Internet service providers, Internet business providers (e.g., providers of online shopping, searching, etc.), or any other type of business information source. Further, while there are advantages when the directory listing server 102 receives the business listings over the network 108, this is not a limitation. In other aspects, a listing information source 104 can provide a group of business listings using recordable media, such as CDs, DVDs, hard drives, etc.

The listing sources 104 can provide business information to the directory listing server 102 actively, passively, or a combination thereof. An example of actively providing business information would be where Internet users provide business information regarding various businesses to a review service provider. The review service can then communicate the business information received from the Internet users to the directory listing server 102 in a group of business listings. An example of passively providing business information would be where the directory listing server 102 is in communication with a listing sources 104 that include telephone directory providers. The telephone directory providers can each provide a distinct group of business listings to the directory listing provider 102. Regardless of the type of listing source 104, the directory listing server 102 can receive multiple groups of business listings, where each business listing group can be from a different listing source 104.

The business listing groups provided by listing sources 104 can include any information about a business. For example, the information can include a business name, address, telephone number, email address, web-site address, products information, hours of operation, promotions, geographic location, geographic area of service, description (e.g., type and sub-type), number of employees, names or contact information of employees, or any other type of business information. Moreover, one or more business listings provided by listing sources 104 can be incomplete, such that a listing source 104 can provide a business's name, but fail to provide the business's address or other business information. There can also be overlap between the business information included in the business listings groups received from different listing sources 104. For example, one or more business listings received from different listing sources 104 can be regarding the same business.

In one aspect, the directory listing server 102 structures a group of business listings received from a listing source 104 into a common format for convenient comparison and further processing. In other aspects, the directory listing server can process a business listing group without formatting the business listings into any particular format.

A table 200 illustrating an example organization of a business listing group received from a listing source is presented in FIG. 2. As shown in the figure, table 200 is organized in a row and column format for convenience. Each row in table 200 includes business information regarding a particular business listing. Each column describes a type of information regarding a business, such as "Category", "Sub-category", "Name", "Address", "Telephone", "Fax", "Email", "Website", "Hours", etc. Other business information, such as multiple telephone numbers, locations, special hours of operation, promotions, etc., can be included in table 200 by adding more columns. Where adding more columns is impractical or not desirable, additional rows for the same business listing can also be added. For example, a group of business listings including information regarding a business having multiple locations, contact information, hours, etc., can be split into multiple rows. In this case, each row can include some columns that have the same data (e.g., Name and Category of the business), while other columns can contain different information (e.g., address, telephone, etc.) While only a few rows and columns are illustrated, table 200 can include any number of rows and columns, depending upon the number of business listings and the type of business listing data that are received in a business listing group by the directory listing server 102 from a listing source 104.

Figure 3:
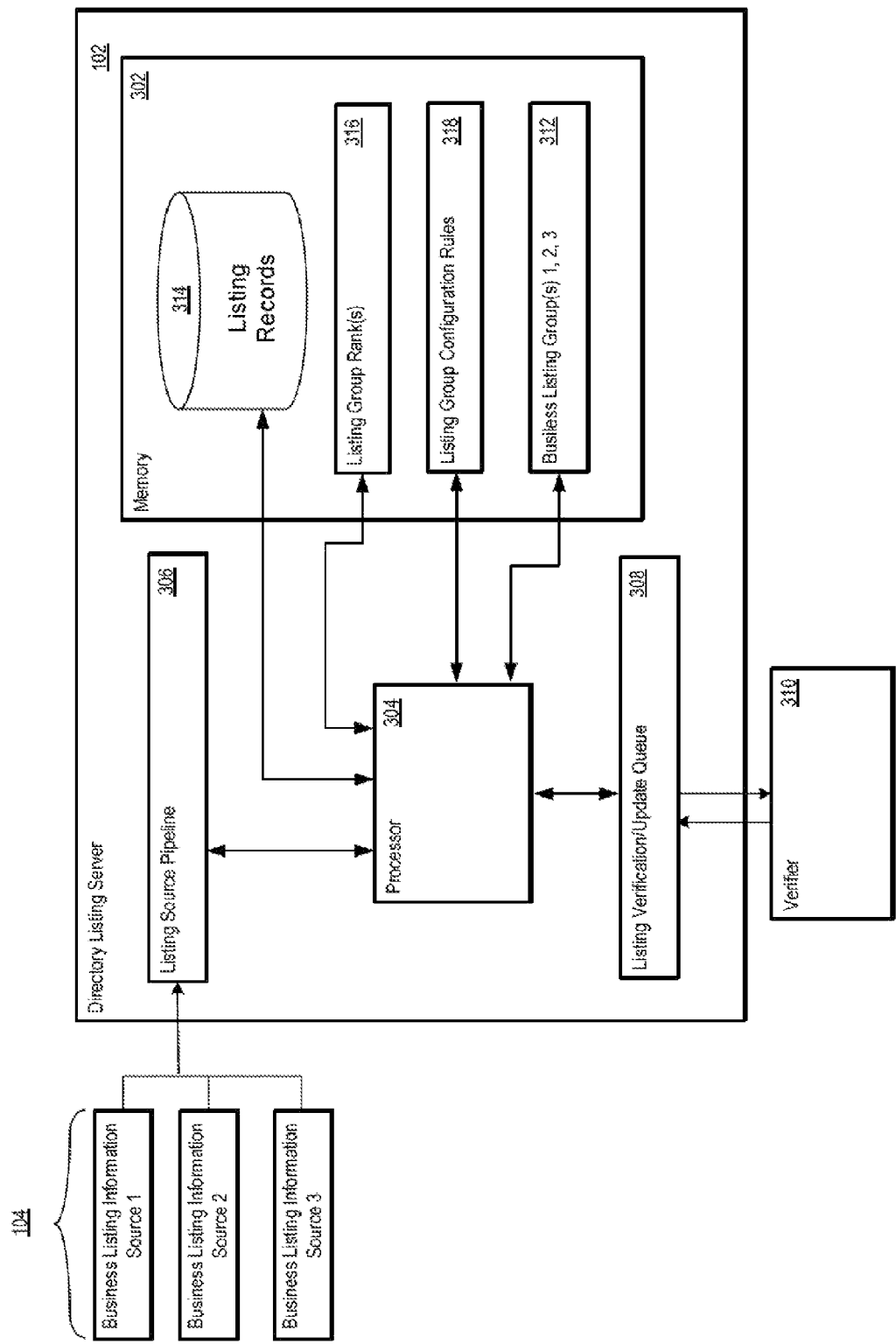
FIG. 3 illustrates an example of a directory listing server in accordance with aspects of the disclosure.

FIG. 3 illustrates one example of the directory listing server 102 in accordance with various aspects of the disclosure. In this example, the directory listing server 102 includes a memory 302, a processor 304, a listing source pipeline 306, and a listing verification/update queue 308. The directory listing server 102 can also includes other components (not shown) typically present in computing devices, such as, for example, input/output ports, network cards, a keyboard, a display, a mouse, etc.). In addition to being communicatively coupled to the listing sources 104, the directory listing server is also communicatively coupled to a verifier 310. The directory listing server 102 can be in direct communicate with the verifier 310 as seen in the figure, or, alternatively, it can also be configured to communicate with the verifier 310 over the network 108. In one aspect, the listing information sources 104 and the verifier 310 can be configured similarly to the directory listing server 102, and can include a processor, memory, and other components and peripherals typically found in computing devices.

Memory 302 of directory listing server 102 stores information accessible by processor 304, including instructions (not shown) that can be executed by the processor. The processor 304 can be any well-known processor, such as a commercially available CPU. Alternatively, the processor can be a dedicated controller such as an ASIC.

The instructions executed by the processor 304 can be any set of instructions to be executed directly (such as machine code) or indirectly (such as scripts) by the processor. In that regard, the terms "instructions," "steps", "process", and "programs" may be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

The memory 302 also includes data, such as the listing groups 312, listing records 314, listing group ranks 316, and listing group configuration rules 318. The data within the memory 302 can be retrieved, manipulated or stored by the processor. The memory 302 can be of any type or combination of tangible memory capable of storing information accessible by the processor 304, such as a hard-drive, memory card, ROM, RAM, DVD, CD-ROM, write-capable, and read-only memories.

Data within the memory 302 can be retrieved, stored or modified by processor 304 in accordance with the instructions. For instance, although the system and method is not limited by any particular data structure, the data can be stored in computer registers, in a relational database as a table having a plurality of different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories (including other network locations) or information that is used by a function to calculate the relevant data.

Although FIG. 3 functionally illustrates the components of the directory listing server 102 within the same block, the processor 304 and memory 302 can comprise multiple processors and memories that may or may not be stored within the same physical housing. For example, some of the instructions and data can be stored on removable CD-ROM and others within a read only computer chip. Some or all of the instructions and data can be stored in a location physically remote from, yet still accessible by, the processor. Similarly, the processor 304 can comprise a collection of processors which may or may not operate in parallel.

In one aspect, the processor 304 in the directory listing server 102 receives business listing groups from the listing sources 104 via the listing source pipeline 306. While the listing source pipeline 306 is illustrated separately for convenience, in one aspect it can be part of the memory 302 or implemented using other conventional hardware. Each of the three listing information sources 104 depicted in FIG. 3 can provide a business listing group to the directory listing server 102 (e.g., via the network 108 or other suitable medium). The processor 304 receives each business listing group via the listing source pipeline 306 and stores the received business listing groups into memory 302 as listing group(s) 312. In addition to the business information, each listing group 312 can also include data (e.g., metadata) for identifying and/or categorizing the business listing information received from a listing source 104. In one aspect, such metadata can also be provided to the directory listing server 102 by the listing sources 104 separately. The processor 304 in the directory listing server can use the additional data to organize the business listing groups 312 into a common format as described above, or, alternatively, the processor 304 can be configured to store and process the received business listing groups 312 in the same format as that received from the listing sources 104.

In one aspect, the directory listing server 102 ranks each listing group 312 based on criteria contained in the listing group configuration rules 318. An example of listing group configuration rules 318 for each of the listing groups 312 (namely, "Business Listing Group 1, "Business Listing Group 2", and Business Listing Group 3") is illustrated in table 400 in FIG. 4. In accordance with this aspect, the processor 304 initiates the ranking of the listing groups 312 by extracting a sample set of business listings ("sampled listings") from each of the listing groups 312 based on criteria included in the listing group configuration rules 318. For example, the processor 304 extracts sampled listings corresponding to a sample size ("Sample") of 5% from the total number of listings in each of the three listing groups 312. The processor 304 then ranks the listings groups 312 based on verification information regarding the accuracy of the sampled listings as described below.

In addition to the sample size criteria, the listing group configuration rules 318 can include additional criteria that are used by the processor 304 for ranking the listing groups 312. As seen in the table 400, for example, the additional criteria can specify a "Category" and "Sub-category" for the business listings constituting the sampled listings selected from each of the listing groups 312. The additional criteria included in the listing group configuration rules 318 can be used to select sampled listings in various ways. In one aspect, some or all of the criteria can be combined when selecting sampled listings in one or more listing groups 312. For example, in the listing group configuration rules illustrated in table 400, the processor 304 can extract sampled listings from each listing group 312 that constitute 5% of the business listings that fall within the category "Automotive" and sub-category "Dealers".

While a particular example of the listing group configuration rules 318 is illustrated in FIG. 4, this is not a limitation. For example, the sample size criteria need not only be specified as a percentage as shown in FIG. 4; in another example it can be specified as number of business listings. In fact, in one aspect the sample size need not be included at all. For example, the criteria for the selection of the sampled listings can be all listings that fall within the category ("Automotive") (and/or the sub-category ("Dealers")) for each of the listing groups 312. In addition, the criteria used to select sampled listings from each of the listing groups can be the same or different. The criteria can also include additional or completely different criteria, such as geographical location of the business, size of the business (e.g., number of employees), nature of the business (e.g., manufacturing or service), whether public or private, or indeed any information associated with a business. As a result, the number and type of sampled listings selected for a particular listing group 312 can be related (e.g., by category, sub-category, etc.) to the number and type of sampled listings selected for another listing group 312 or can be unrelated. To summarize the foregoing generally, the listing group configuration rules 318 can include any criteria that can be used alone or in combination to select a set of sampled listings from each of the listing groups 312 by the processor 304.

As previously noted, the processor 304 ranks the listing groups 312 based a determination of the accuracy of the sampled listings selected from each of the listing groups 312. In one aspect, the processor 304 receives verification information regarding the sampled listings from the verifier 310 (shown in FIG. 3). For example, the processor 304 can provide the sampled listings selected for each of the listing groups 312 to the verifier 310 via the listing verification/update queue 308 ("verification queue"). The processor 304 can also receive verification information from the verifier 310 regarding the sampled listings via the verification queue 308.

Upon receiving the verification information regarding the accuracy of the sampled listing selected for each listing group 312, the processor 304 determines an appropriate rank for each of the listing groups 312. The ranks determined for the listing groups are stored in the group rank 316 in the memory 302. An example ranking of the listing groups 312 is illustrated in FIG. 5. The processor 304 ranks each of the three listing groups "Business Listing Group 1", "Business Listing Group 2", and "Business Listing Group 3" based on an accuracy percentage that is determined based on the verification information. As seen in the figure, "Business Listing Group 1" has been assigned the highest rank of "1". This rank is assigned based on verification information that indicates that the sampled listings selected for "Business Listing Group 1" were "100%" accurate. Similarly, "Business Listing Group 3" has the second highest rank of "2" based on verification information indicating that the sampled listings selected for this group were determined to be "96%" accurate. Finally, a rank of "3" has been assigned to "Business Listing Group 2" based on verification information that indicates that the sampled listings selected from this group were determined to be "88%" accurate. While the listing groups 312 are illustrated as being ranked "1", "2" and "3" for ease of explanation, this is not a limitation, and any other suitable number, symbol, or character can be used. In one aspect, for example, the processor 304 can also use the accuracy percentage determined for each listing group as a measure of the rank assigned to a respective listing group 312.

The accuracy percentage of the sampled listings can be calculated by the processor 304 based on verification information provided by the verifier 310. For example, in one aspect the verifier 310 can identify listing information in each of sampled listings as either correct or incorrect, and the processor 304 can then determine the accuracy of the sampled listings using such information. In other aspects, the verification information received from the verifier 310 can also include an accuracy percentage (or an accuracy score) for the sampled listings selected for each listing group 312.

Once the listing groups 312 are ranked by determining the accuracy of the business data in the sampled listings based on the verification information, the processor 304 imports or aggregates the business listings included in the highest ranked listing group 312 into the listing records 314. As noted previously, the listing records 314 include business listings to be provided by the directory listing server 102 to the client devices 106 upon request. In one aspect, the processor 304 imports the business listings in the highest ranked listing group 312 into listing records 314 without further verification of the imported information.

In other aspects, some or all of the business listings imported from the highest ranked listing group 312 (excluding, for example, the business listings already verified as sampled listings) can also be verified and/or updated by the processor 304 in the manner described above. For example, as with the sampled listings, the processor 304 can provide one or more of the unverified listings imported from the highest ranged listing group 312 to the verifier 310 for verification. The processor 304 can then receive verification and/or updated information regarding the unverified listings, and exclude or correct the listings that are determined to contain inaccurate and/or incomplete information. In some cases, verifying and/or updating the one or more of the remaining unverified listings in the highest ranked listing group can further enhance the accuracy of the information that is provided to the client devices by the directory listing server.

After first importing the listings from highest ranked listing group into the listing records 314, the processor 304 can continue to aggregate (with or without further verification) the business listings contained in the remaining listing groups 312. For example, the processor 304 can select a second listing group 312 from the remaining listing groups 312 (e.g., the second highest ranked "Business Listing Group 3") from which listing information is next imported into the listing records 314. In one aspect, processor 304 can select the next listing group from which listing information is imported based not only on the rank assigned to each of the remaining listing groups 312, but also based on the degree of overlap of the business listing information contained in each of the remaining listing groups 312 and the listings already imported into the listing records 314. This aspect is discussed below with reference to FIG. 5.

As seen in FIG. 5, the processor 304 can determine a degree of overlap between each of the listing groups 312. For example, the processor 304 can analyze the business listings contained in "Business Listing Group 1" and determine that there is a "95%" overlap between the listings contained in "Business Listing Group 1" and "Business Listing Group 3".

Similarly, the processor 304 can also determine that there is a "75%" overlap between the listings in "Business Listing Group 1" and "Business Listing Group 2". Similar determinations can also be made for the remaining listing groups, namely, "Business Listing Group 2" and "Business Listing Group 3" as shown in the figure. Such determination of the overlap between the listing groups 312 can be done before, after, or simultaneously with the ranking of the listing groups.

In addition, a business listing in any of the listing groups 312 can be tagged by the processor 304 to indicate whether the business listing is an overlapping listing with another listing in another listing group. An overlapping listing can be a business listing in one listing group that includes the same (or similar) information found in a business listing in another listing group. When overlapping listings are found in two (or more) groups, the listings in each group can be tagged as overlapping listings. In one aspect, the tag assigned to an overlapping listing can also particularly identify the other listing groups which contain the overlapping listing. In another aspect, the processor 304 can also tag listings that are determined to be non-overlapping listings, namely, where the processor 304 determines that a particular listing in one listing group is not found in any of the listings contained in any of the other listing groups 312.

The determination that a particular listing in one listing group overlaps with another listing in another listing group can be implemented in several ways. For example, in one aspect two listings can be considered overlapping listings if they identify the same business (e.g., include the same business name). In other aspects, the two listings can be considered overlapping listings if other information is the same between the two listings, such as, for example, a telephone number, a website address, an email address, etc. In a yet another aspect, two listings can be considered overlapping listings if all business information contained in the two listings is the same.

As noted above, the degree of overlap between the listings already imported into the listing records 314 and the listings in the remaining listing groups 312 can be used by the processor 304 to select the next listing group that is aggregated into the listing records 314. For example, after first importing the listings in the highest ranked listing group (e.g., "Business Listing Group 1") into business listing records 314, the processor can select the next listing group from which listings are imported as the one that has the least overlap with the already imported listings. In the example shown in FIG. 5, the remaining listing group that has the least overlap with the already imported listings from the "Business Listing Group 1" is determined to be "Business Listing Group 2". Thus, the processor 304 selects "Business Listing Group 2" over "Business Listing Group 3" as the next listing group from which to import business listings into business listing records 314 even though the "Business Listing Group 3" is ranked higher than the "Business Listing Group 2". Once "Business Listing Group 2" is selected as the next listing group, the processor 304 imports non-overlapping listings in "Business Listing Group 2" into the listing records 314, and also possibly aggregates overlapping listings in "Business Listing Group 2" into the listing records 314. In addition, the processor 304 can also verify some or all of the listings imported from the "Business Listing Group 2" in the manner described before.

After importing business listings from the second listing group, the processor 304 can repeatedly process the remaining listing groups 312 by selecting another listing group 312 that has the least overlap with the listings already imported into the listing records 314. The processor can then continue to import non-overlapping listings from each remaining selected listing group 312 into the listing records 314 as described above, as well as possibly aggregating information from overlapping listings in the remaining selecting listing groups into the listing records 314. In the example above, since only one listing group remains ("Business Listing Group 3") after importing and/or aggregating the listings from "Business Listing Group 2", the processor 304 now imports the non-overlapping listings in "Business Listing Group 3" into the listing records 314, and possibly aggregates information from the overlapping listings in "Business Listing Group 3" into the business listing records 314. The final aggregation order of the business information for each of the listing groups 312 is illustrated under "Aggregation Order" column in FIG. 5.

The example described above is just one of several possible alternatives. In other aspects, the processor 304 can determine the aggregation order of the listing groups based on various combinations of the rank and overlap of the listing groups. In one aspect, the processor 304 can use the ranking of the listing groups to determine the aggregation order, and select the listing group having the least overlap only when two listing groups are ranked the same or within a predetermined range. For example, in the case where two listing groups are ranked such that the two listing groups are within a given percentage (e.g., top 10%) of all ranked listing groups (or each other), the processor can select the one that has the least overlap with the business listings that have been already imported into the business listing records 314. In other words, the processor 304 can take overlap into account for remaining listing groups that have the same (or close) accuracy percentages (or rank) to each other. Alternatively, the processor 304 can also determine the aggregation order of the listing groups based solely on the ranks and without taking the overlap into account. Yet further, the processor 304 can determine the aggregation order of a listing group based on its rank, but only when the rank satisfies predetermined criteria. For example, the processor 304 can select a listing group only if its rank is in a given percentage (e.g. top 15%) of all ranks assigned to the listing groups.

In other aspects, the processor 304 can determine the aggregation order of the listing groups based on the degree of overlap, but only when the ranks assigned to the listing groups meet predetermined criteria. For example, the processor 304 can select a listing group having the least overlap in the manner described above, but only when the rank assigned to that listing group is above a particular threshold (e.g., within 50% of all top ranked listing groups). Yet further, the processor 304 can determine the aggregation order based on the degree of overlap, and use the ranks only when two (or more) listing groups are determined to have a given degree or range of overlap. For example, the processor 304 can select the higher ranked listing group from two listing groups that are each determined to have less than 10% overlap with the listings already imported into the listing records 314. Alternatively, the processor 304 can also determine the aggregation order of the listing groups based solely on the degree of overlap and without taking the ranks of the listing groups into account. Yet further, the processor 304 can also determine the aggregation order of the listing groups using the determined overlap between one or more listing groups and the already imported listings, but only when a given listing group or listing groups are determined to have a predetermined degree (or range) of accuracy (e.g., 70% or higher) based on the accuracy information provided by the verifier 310.

The ranks assigned to the listings groups can be determined based not only on the verification information regarding the sampled listings as described above, but can also be determined based on the degree of overlap and agreement between the business listings in the listing groups. Further still, the processor 304 can choose any combination of the foregoing to determine the highest ranked listing group or the next listing group from which business listings are imported or aggregated into the listings in the listing records 314. The particular combinations and criteria that the processor 304 uses to determine from which listing group business listings are to be imported or aggregated into the listing records 314 can be included in the listing group configuration rules 318 of the directory listing server 102.

The verifier 310 can be configured to obtain accuracy information for the listings in the listing groups 312 in several ways. For example, in one aspect the verifier 310 can be configured to include functionality to conduct an automated survey (e.g., telephonic) of each business included in the listings to be verified. Each business can thus be surveyed to confirm and/or update relevant information about itself, such as, the business's name, telephone number, address, email, fax, web-site, hours of operation, category, etc. The responses provided by the business can be used to confirm the accuracy of the information for each business included in the sampled listing (e.g., using speech recognition or identifying the keys pressed on the telephone keypad). In addition, where the responses indicate that a business listing includes inaccurate or incomplete information, the proper updated information can be requested and obtained. The updated information can then be provided by the verifier 310 in the verification queue 308 as part of the verification information. The processor 304 can update one or more business listings with the proper information appropriately.

In another aspect the accuracy of the information in the business listings can be verified manually. In this case, the verifier 310 can provide access to the business listings to a moderator, and the moderator can contact each business and request manual confirmation/update of the listing information as described above. In some aspects, contacting a business manually can result in receiving more complete information from the business. For example, in a case where a business listing contains incomplete information (e.g., missing address) such information can be identified and requested by the moderator. While such information can also be requested in an automated survey, in some cases a business may be more willing to provide the information to a human moderator. Regardless of the manner in which it is obtained, verification information for the business listings that are selected by the processor 304 can be provided by the verifier 310 to the directory listing server 102.

Figure 6:
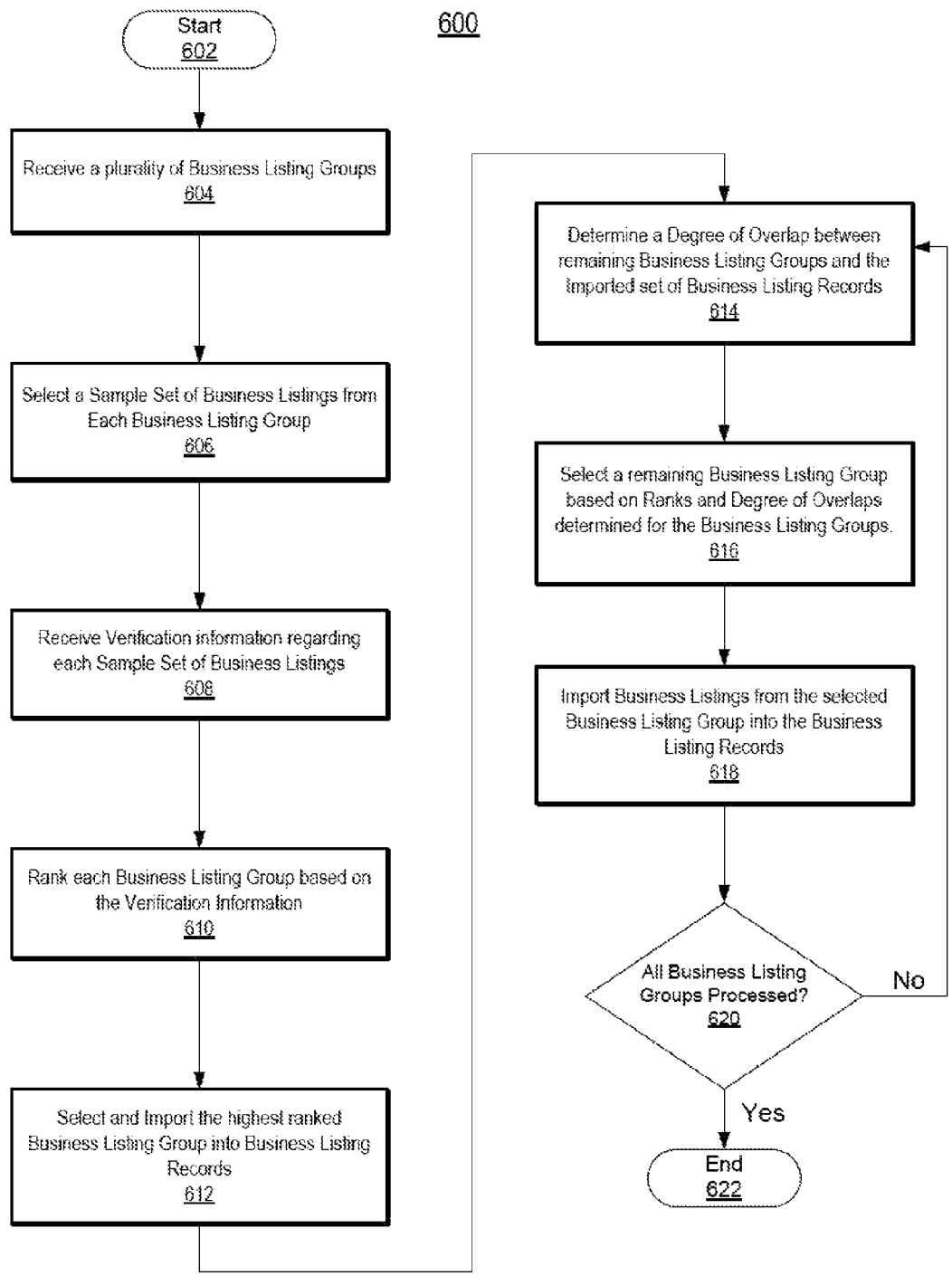
FIG. 6 illustrates an example of a process flow in accordance with aspects of the disclosure.

A process in accordance with various aspects of the disclosure is illustrated as flow diagram 600 in FIG. 6. The following operations do not have to be performed in the precise order described below. Rather, certain operations can occur in a different order or simultaneously.

The process begins in block 602. In block 604, a processor receives a plurality of business listing groups. For example, the processor can receive the plurality of business listing groups over a network, where each business listing group can be provided by a different business listing source. A business listing group includes a plurality of business listings, and a business listing contains business information regarding a business. In one aspect, the business listing groups can include additional data (e.g., metadata) for identifying and/or categorizing the business information contained in the business listings. Furthermore, in one embodiment the processor can organize the business listings contained in each business listing group into a common format prior to further processing. Alternatively, the processor can store and process the business listings in the same format as that received from the listing sources.

As noted previously, a business listing can include a variety of business information regarding a business. For example, a business listing can include the business name (or other identifier), description, geographical location(s), telephone number(s), email addresses, hours of operation, website information, product information, contact information, stock symbol, or any other type of information about the business.

In block 606, the processor selects a sample set of business listings from each business listing group for verification. The sample set of business listings can be selected in various ways. In one aspect the processor can select a sample set of listings based on a percentage of the total number of listings contained in a listing group. The percentage used to select a sample set of business listings for one listing group can be the same or different than the one used to select a sample set of listings for another listing group. The sample set of business listings selected for each listing group can be based on a category and/or a subcategory of business information contained in each listing group. In yet other aspects, the sample set of business listings can also be selected using other type of information regarding businesses, such as the geographical location, size (e.g., number of employees), nature (e.g., manufacturing or service), description, etc. The criteria used to select a sample subset of business listings from each business listing group can be stored as one or more listing group configuration rules in a memory accessible to the processor.

In block 608, the processor receives verification information regarding the sample set of business listings selected from each business listing group. For example, the processor can provide access to the sample set of listings for verification via a queue or other suitable means. The verification can be conducted in various ways, such as via an automated survey, a manual survey, or a combination of both. Each business included in the sample set of listings can be contacted to provide information that can be received by the processor (via a queue, for example) as part of the verification information. In one aspect, the verification information can include updated information regarding one or more of sample listings. The update information can be used by the processor to update missing or inaccurate information contained in one or more business listings in the business listing groups as appropriate.

In block 610, the processor ranks the business listing groups based on the verification information. In one aspect the processor can receive verification information that identifies whether information in one or more listings is accurate or not. Based on such information, the processor can determine an accuracy percentage for each selected set of sample listings (e.g., as an average accuracy). The accuracy percentage can be used to rank each respective listing group appropriately.

In block 612, the processor selects the highest ranked (the most accurate) business listing group and imports the business listings in the group into business listing records. For example, the processor can store the business listings imported from the highest ranked listing groups into a listing records database. The processor can also provide business information contained in the imported listings to a client device in response to a request for such information from a user.

In block 614, the processor determines a degree of overlap between the business listings already imported into the listings records and the business listings contained in each of the remaining listing groups. In one aspect, the processor identifies and tags overlapping listings. As noted above, an overlapping listing can be a listing that includes all or part of the same business data that is included in another listing. In another aspect, the process also identifies and tags non-overlapping listings.

In block 616, the processor selects a listing group from the remaining listing groups based on one or more combinations of ranks and/or degrees of overlap determined for each of the listing groups. For example, the processor can select a listing group from the remaining listing group that contains business listings having the least degree of overlap with the business listings already imported into the listing records in comparison with the other remaining listing groups. Alternatively, the processor can select the business listing group with the least overlap, but only if the accuracy (or rank) of that business listing group is above a threshold. By way of another example, the processor uses the ranking of the remaining listing groups to select a listing group, and selects the listing group having the least degree of overlap only when two or more listing groups are ranked the same or within a predetermined range of each other.

In block 618, the processor imports one or more business listings in the listing group selected in block 616 into the listing records. For example, the processor can import non-overlapping business listings from the selected listing group into the listing records. The processor can also aggregate into the listing records information from business listings in the selected listing group that overlap previously imported business listings. In one aspect, the processor can also verify one or more of the business listings imported into the listing records from the selected listing group. The processor can receive verification information for the imported listings, and exclude (or delete) business listings that are determined to have inaccurate and/or incomplete information from the listing records. In another aspect, the verification information received by the processor can include updated information regarding one or more listings that contain inaccurate or incomplete information. The processor can use such updated information to modify such business listings appropriately.

In block 620, the processor determines if there are any remaining listing groups that need to be processed. If so, the processor repeats steps 614 to 620 for each remaining listing group. If not, the process ends in block 622.

Although aspects of the invention herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A method for processing business listings, the method comprising:
  receiving a plurality of business listing groups, each business listing group including a plurality of business listings;
  selecting a sample set of business listings from each business listing group for verification;
  receiving verification information for the sample set of business listings selected from each business listing group;
  assigning, using a processor, a rank to each of the plurality of business listing groups based on the received verification information for each of the sample sets of business listings;
  selecting a highest ranked business listing group based on the rank assigned to each business listing group; and,
  importing the plurality of business listings in the highest ranked business listing group into a set of business listing records for presentation to a user;
  after importing the plurality of business listings in the highest ranked business listing group, determining for each remaining business listing group a percentage of overlap between the plurality of business listings in that remaining business listing group and the plurality of business listings in the imported set of business listing records;
  selecting, using the processor, a particular business listing group of the remaining business listing groups having a least percentage of overlap; and
  importing at least one business listing in the selected particular business listing group that does not overlap with the plurality of business listings in the highest ranked business listing group into the set of business listing records for presentation to the user.

2. The method of claim 1, wherein at least some of the business listing groups are received from different listing information sources.

3. The method of claim 1, further comprising organizing the plurality of business listings in the received plurality of business listing groups into a common format.

4. The method of claim 1, further comprising:
  selecting a business record from the set of business listing records for verification;
  receiving verification information for the selected business record, the verification information for the selected business record including updated information; and,
  updating the selected business record in the set of business listing records based on the updated information.

5. The method of claim 1, wherein the verification information includes accuracy percentage information for the sample set of business listings selected for each business listing group.

6. The method of claim 1, further comprising
  (a) importing at least one business listing in the selected particular business listing group, determining the for each remaining business listing group a new percentage of overlap between the plurality of business listings in that remaining business listing group and the plurality of business listings in the imported set of business listing records;
  (b) selecting another business listing group from the remaining business listing groups having a least new percentage of overlap; and
  (c) importing at least one business listings in the selected business listing group into the set of business listing records; and
  repeating (a), (b) and (c) until no business listing groups remain.

7. The method of claim 1, further comprising:
  receiving a request for business information from a user over a network;
  selecting one or more business listings in the set of business listing records based upon the request; and,
  providing at least a portion of the business information in the selected one or more business listings to the user over the network.

8. The method of claim 1, wherein the at least one business listing is a non-overlapping listing for the selected particular business listing group and the imported set of business listing records.

9. The method of claim 1, wherein determining the percentage of overlap is further based on whether a business listing of the plurality of business listings in that remaining business listing group has a same title as a listing of the plurality of business listings in the imported set of business listing records.

10. A system for processing business listings, the system comprising:
a memory storing instructions and data, the data including a plurality of business listing groups, each business listing group including a plurality of business listings; and,
a processor configured to execute the instructions, wherein the instructions, when executed by the processor, cause the processor to:
select a sample set of business listings from each business listing group for verification;
receive verification information for the sample set of business listings selected from each business listing group;
assign a rank to each of the plurality of business listing groups based on the received verification information for each of the sample sets of business listings;
select a highest ranked business listing group based on the rank assigned to each business listing group; and,
import the plurality of business listings in the highest ranked business listing group into a set of business listing records for presentation to a user;
after importing the plurality of business listings in the highest ranked business listing group, determine for each remaining business listing group a percentage of overlap between the plurality of business listings in that remaining business listing group and the plurality of business listings in the imported set of business listing records;
select a particular business listing group of the remaining business listing groups having the least determined percentage of overlap; and
import at least one business listing in the selected particular business listing group that does not overlap with the plurality of business listings in the highest ranked business listing group into the set of business listing records for presentation to the user.

11. The system of claim 10, wherein at least some of the business listing groups are received from different listing information sources.

12. The system of claim 10, wherein the instructions further cause the processor to organize the plurality of business listings in the received plurality of business listing groups into a common format.

13. The system of claim 10, wherein the instructions further cause the processor to:
select a business record from the set of business listing records for verification;
receive verification information for the selected business record, the verification information for the selected business record including updated information; and,
update the selected business record in the set of business listing records based on the updated information.

14. The system of claim 10, wherein the verification information includes accuracy percentage information for the sample set of business listings selected for each business listing group.

15. The system of claim 10, wherein the instructions further cause the processor to:
receive a request for business information from a user over a network;
select one or more business listings in the set of business listing records based upon the request; and,
provide at least a portion of the business information in the selected one or more business listings to the user over the network.

16. A tangible non-transitory computer-readable recording medium having instructions stored thereon, the instructions, when executed by a processor, cause the processor to perform the operations of:
receiving a plurality of business listing groups, each business listing group including a plurality of business listings;
selecting a sample set of business listings from each business listing group for verification;
receiving verification information for the sample set of business listings selected from each business listing group;
assigning, using a processor, a rank to each of the plurality of business listing groups based on the received verification information for each of the sample sets of business listings;
selecting a highest ranked business listing group based on the rank assigned to each business listing group; and,
importing the plurality of business listings in the highest ranked business listing group into a set of business listing records for presentation to a user;
after importing the plurality of business listings in the highest ranked business listing group, determining for each remaining business listing group a percentage of overlap between the plurality of business listings in that remaining business listing group and the plurality of business listings in the imported set of business listing records;
selecting a particular business listing group of the remaining business listing groups having the least determined percentage of overlap; and
importing at least one business listing in the selected particular business listing group that does not overlap with the plurality of business listings in the highest ranked business listing group into the set of business listing records for presentation to the user.

* * * * *